(No Model.)
W. BECKERT.
VEHICLE SPRING AND AXLE ATTACHMENT.
No. 520,476. Patented May 29, 1894.
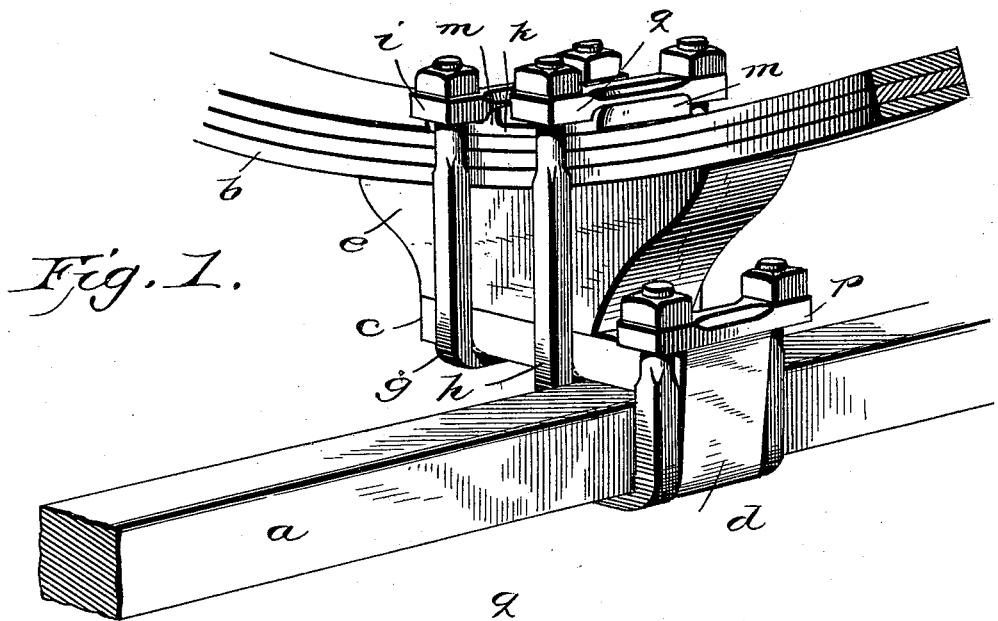

UNITED STATES PATENT OFFICE.

WILLIAM BECKERT, OF ALLEGHENY, PENNSYLVANIA.

VEHICLE SPRING AND AXLE ATTACHMENT.

SPECIFICATION forming part of Letters Patent No. 520,476, dated May 29, 1894.

Application filed January 2, 1894. Serial No. 495,395. (No model.)

*To all whom it may concern:*

Be it known that I, WILLIAM BECKERT, a citizen of the United States, residing at Allegheny, in the county of Allegheny and State of Pennsylvania, have invented certain new and useful Improvements in Vehicle Spring and Axle Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

Heretofore it has been customary to attach the lower section of the usual leaf-spring directly above or on top of the axle. When so attached the entire weight rests directly upon the top of the axle, and under heavy strain or rough roads the axle receives the full force of shocks.

Now it is the purpose of my invention to attach the spring on the axle in such a way as to throw all strain on the attaching point of the spring out of vertical alignment with the spindles of the wheels, so that the shock incidental to heavy loads will fall indirectly on the point of attachment and in such a manner as to greatly facilitate the forward motion of the vehicle, and allow it to move more freely and easily.

To this end the invention consists in the peculiar construction and combination of parts, to be fully explained hereinafter, and finally embodied in the claims.

Referring to the accompanying drawings: Figure 1, represents a perspective view of a portion of the vehicle axle having a spring attached after the manner of my invention; Fig. 2, a section thereof taken across the axle; Fig. 3, a detail perspective view of the plate for holding secure the clips.

The reference letter $a$, indicates the axle, which is shown broken away in the drawings, and $b$, a portion of the spring. Mounted upon the upper side of the axle $a$, is the bar $c$, which is provided with the downwardly and rearwardly extending offset $d$ adapted to embrace the axle and to lie flush with its front and lower sides, thereby securing the bar $c$, from displacement, axially on the axle.

Mounted upon the bar $c$ is the block $e$, which extends from a point directly rearward of the axle to the rear extremity of the bar. This block gradually enlarges as it extends upward so that the upper ends will overhang the axle and the rear end of the bar $c$ respectively, while the upper face of the block curves in the arc of a circle and is slightly inclined rearwardly. The curve in the upper face of the block $e$ is formed so as to adapt said block for the reception of the spring $b$, and this spring is here shown to be of the elliptical class though it may be changed to any other form without departing from the spirit of my invention. The block $e$ and spring $b$ are secured rigidly upon the bar $c$, and the bar made secure to the axle by means of the clips $g$ and $h$. The clip $g$ is formed of a U-shaped piece of steel of a size that will admit it to snugly embrace the rear end of the bar $c$, block $e$ and spring $b$, while the ends of its arms project a slight distance above the upper surface of the spring, where they are provided with the cross-bar $i$. This bar extends across the upper face of the spring $b$ and is provided with eyes adapted for the reception of the clip arms, the connection being made secure by nuts upon the ends of said arms.

Arranged below the bar $i$, and directly upon the upper face of the spring is the plate $k$, shown in detail by Fig. 3. This plate is of a width equal to that of the spring, and extends forward and under the clip $h$, its upper surface being provided with the flanges $m$ and lugs $n$ between which the cross bar $i$ of the clip $g$ and the corresponding cross bar of the clip $h$ are arranged. The plate is secured to the spring by means of a bolt $o$, which passes from the upper side of the plate into the several sections of the spring. By means of this plate the cross-bars of the clips are immovably secured in place and their displacement rendered impossible.

The clip $h$ consists of two duplicate J-shaped bars arranged on either side of the block $e$, and extending from the cross-bar $q$ downwardly to the lower side of the axle, thence forward and upwardly around the same, to the upper side of the extreme forward end of the bar $c$. At this point the ends pass through eyes in the cross-bar $p$, which extends across the upper face of the bar c, and the whole is rendered secure by nuts operating over said ends. By this arrangement it will be seen that the arm c, block e, and spring b, are drawn closely together and held incapable of independent movement; and in addition to this the clip h operates to secure the bar c to the axle in such a way as to render its accidental displacement exceedingly difficult. The principal function of this peculiar arrangement of the spring in relation to the axle spindles is, that vibrations of the weight on the arm c, (not directly upon the axle, but directly behind it) will tend to push or crowd the axle forward thus assisting in the locomotion of the vehicle. The operation of this function is shown in Fig. 2, and will, it is thought, be apparent, for since the weight is applied behind the axis of the wheels and yet directly to the axle the vibrations of the load rock the latter, and this action will tend to urge the wheels.

Having thus described the invention, what I claim as new, and desire to secure by Letters Patent, is—

1. In a vehicle, the combination of an axle, of a bar resting upon the axle at its front end and extending down on the front and beneath the nether side of the said axle, the rear portion extending horizontally from the axle a short distance, clips securing the bar to the axle, and a spring arranged at right angles to the axle and attached to and supported on the rear extension of the said bar to transmit the weight of the load to the axle in the rear of the wheel spindles, substantially as set forth.

2. In a vehicle, the combination of an axle, a bar resting upon the axle at its front end and extending down on the front and beneath the nether side of the said axle, the rear portion extending horizontally from the axle a short distance, a cross bar placed on the front end of the axle bar, J-clips arranged in parallel and coincident relation, one on each side of the axle bar to secure it to the axle, a block mounted on the rear end of the axle bar, a spring arranged at right angles to the axle and mounted on the said block, the longer members of the J-clips securing the spring and block to the axle bar, and a U-shaped clip to supplement the action of the vertical portions of the J-clips in securing the spring and block to the axle bar.

In testimony whereof I affix my signature in presence of two witnesses.

WILLIAM BECKERT.

Witnesses:
 JULIUS R. BELÉR,
 C. R. WEITERSHAUSEN.